(12) United States Patent
Shimizu et al.

(10) Patent No.: US 10,214,200 B2
(45) Date of Patent: Feb. 26, 2019

(54) HYBRID VEHICLE

(71) Applicant: TOYOTA JIDOSHA KABUSHIKI KAISHA, Toyota-shi, Aichi-ken (JP)

(72) Inventors: Yu Shimizu, Toyota (JP); Takashi Ando, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 0 days.

(21) Appl. No.: 15/831,856

(22) Filed: Dec. 5, 2017

(65) Prior Publication Data

US 2018/0154884 A1 Jun. 7, 2018

(30) Foreign Application Priority Data

Dec. 7, 2016 (JP) .................. 2016-237651

(51) Int. Cl.
- *B60W 20/10* (2016.01)
- *B60K 6/365* (2007.10)
- *B60W 10/06* (2006.01)
- *B60W 10/30* (2006.01)
- *B60W 20/50* (2016.01)

(52) U.S. Cl.
CPC ............ *B60W 20/10* (2013.01); *B60K 6/365* (2013.01); *B60W 10/06* (2013.01); *B60W 10/30* (2013.01); *B60W 20/50* (2013.01); *B60W 2540/10* (2013.01); *B60W 2710/0644* (2013.01); *B60W 2710/30* (2013.01); *B60Y 2200/92* (2013.01); *B60Y 2300/43* (2013.01); *B60Y 2400/61* (2013.01); *Y10S 903/91* (2013.01)

(58) Field of Classification Search
CPC ...... B60W 20/10; B60W 20/50; B60W 10/06; B60W 10/30; B60W 2710/0644; B60W 2710/30; B60W 2540/10; B60K 6/365; Y10S 903/91; B60Y 2200/92; B60Y 2400/61; B60Y 2300/43
USPC .......................... 701/22; 180/65.21, 65.265
See application file for complete search history.

(56) References Cited

U.S. PATENT DOCUMENTS

| | | | |
|---|---|---|---|
| 2009/0236160 A1* | 9/2009 | Tanaka ................... | B60K 6/365 180/65.265 |
| 2014/0074334 A1* | 3/2014 | Tagawa .................. | B60K 6/445 701/22 |

FOREIGN PATENT DOCUMENTS

JP 2013-203116 10/2013

* cited by examiner

*Primary Examiner* — Marthe Y Marc-Coleman
(74) *Attorney, Agent, or Firm* — Finnegan, Henderson, Farabow, Garrett & Dunner, LLP

(57) ABSTRACT

In a hybrid vehicle including an engine; a first motor configured to generate reverse voltage by rotation; a planetary gear mechanism configured to have three rotational elements connected with a drive shaft coupled with an axle, the engine and the first motor; a second motor configured to input and output power from and to the driveshaft; first and second inverters configured to drive the first and second motors respectively; and an electric storage device, a first control controlling a rotational speed of the engine such that a first electric current to flow through the electric storage device is maximized in a state of gate interruption of the first and second inverters is executed at the time of an evacuation travelling being performed when an ON operation of an accelerator is performed during an inverter failure in which the first and second inverters cannot be normally actuated.

7 Claims, 5 Drawing Sheets

HYBRID VEHICLE

This application claims priority to Japanese Patent Application No. 2016-237651 filed Dec. 7, 2016, the contents of which is incorporated herein by reference

TECHNICAL FIELD

The disclosure relates to a hybrid vehicle, and in detail, relates to a hybrid vehicle in which an engine and two motors are connected with a planetary gear mechanism.

BACKGROUND

Conventionally, as this kind of hybrid vehicle, there has proposed a hybrid vehicle including an engine, a first motor that generates reverse voltage by rotation, a planetary gear mechanism that has three rotational elements connected with a drive shaft coupled with an axles, the engine and the first motor, and a second motor that outputs power to the drive shaft (see PTL 2013-203116, for example). In this vehicle, when the engine is operated during the failure of inverters that drives the first motor and the second motor, the gate interruption of the inverter is performed, and the rotational speed of the engine is controlled such that the first motor generates the reverse voltage. Thereby, the torque generated when the first motor generates the reverse voltage is output to the drive shaft as drive torque, so that the vehicle travels.

CITATION LIST

Patent Literature

PTL 1: JP2013-203116

SUMMARY

By raising the rotational speed of the motor, the torque to be generated when the motor generates the reverse voltage is generated and increased when the reverse voltage exceeds the voltage of the direct current side of the inverter, and then, is gradually decreased after reaching a maximal value (peak). Therefore, in order to maximize the motor torque, the motor needs to have a rotational speed corresponding to the maximal value (peak) with respect to the voltage of the direct current side of the inverter. The reverse voltage of the motor varies depending on the manufacturing variation of the motor, the temperature of the motor, the sensor error of a voltage sensor and the like, and therefore, even when the motor has the rotational speed corresponding to the maximal value (peak) with respect to the voltage of the direct current side of the inverter, the torque to be output from the motor, actually, cannot be maximized.

A main object of a hybrid vehicle in the disclosure is to output a higher torque from the first motor, at the time of performing an evacuation travelling by the torque to be output from the first motor when the first motor generates the reverse voltage in the state of the gate interruption of the inverters during the failure of the inverter.

The hybrid vehicle in the disclosure adopts the following means for achieving the above-described main object.

A hybrid vehicle of this aspect may include an engine; a first motor configured to generate reverse voltage by rotation; a planetary gear mechanism configured to have three rotational elements connected with a drive shaft coupled with an axles, the engine and the first motor; a second motor configured to input and output power from and to the driveshaft; a first inverter configured to drive the first motor; a second inverter configured to drive the second motor; an electric storage device configured to be capable of exchanging electric power with the first motor and the second motor through the first inverter and the second inverter; and a control device configured to control the engine, the first inverter and the second inverter, wherein the control device executes a first control at the time of an evacuation travelling, the first control controlling a rotational speed of the engine such that a first electric current to flow through the electric storage device is maximized in a state of gate interruption of the first inverter and the second inverter, the evacuation travelling being performed when an ON operation of an accelerator is performed during an inverter failure in which the first inverter and the second inverter cannot be normally actuated.

In the hybrid vehicle in the disclosure, at the time of evacuation travelling to be performed when the ON operation of the accelerator is performed during the failure of the first inverter and the second inverter, the first inverter and the second inverter are put into the state of the gate interruption. In this state, the engine is driven, and the first motor is co-rotated. The first motor generates the reverse voltage by rotation, and therefore, when the reverse voltage becomes higher than the voltage of the direct current side of the first inverter and the second inverter, the first motor outputs torque, and electric current flows through the electric storage device so that the electric storage device is charged. The torque output from the first motor is output, as drive torque, to the drive shaft through the planetary gear mechanism, and is used as the torque for vehicle travelling. Because of being caused by the reverse voltage of the first motor, the torque to be output from the first motor increases as the electric current with which the electric storage device is charged increases. Accordingly, by controlling the rotational speed of the engine such that the first electric current to flow through the electric storage device is maximized, it is possible to maximize the torque to be output from the first motor. Thereby, at the time of the evacuation travelling, it is possible to output a higher torque from the first motor.

DETAILED DESCRIPTION OF EMBODIMENTS

Figure 1:
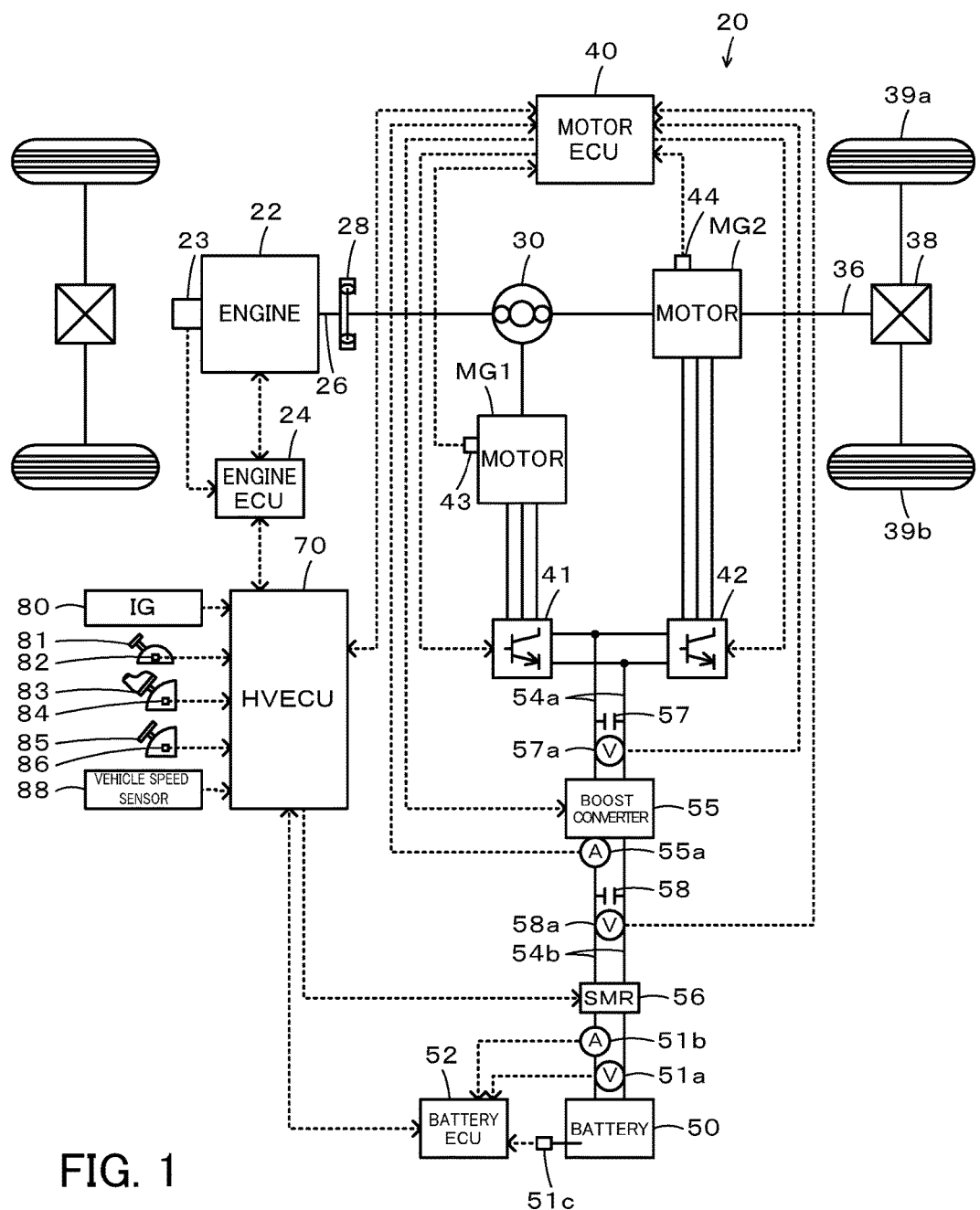
FIG. 1 is a configuration diagram showing an outline of a configuration of a hybrid vehicle 20 in an embodiment.
Figure 2:
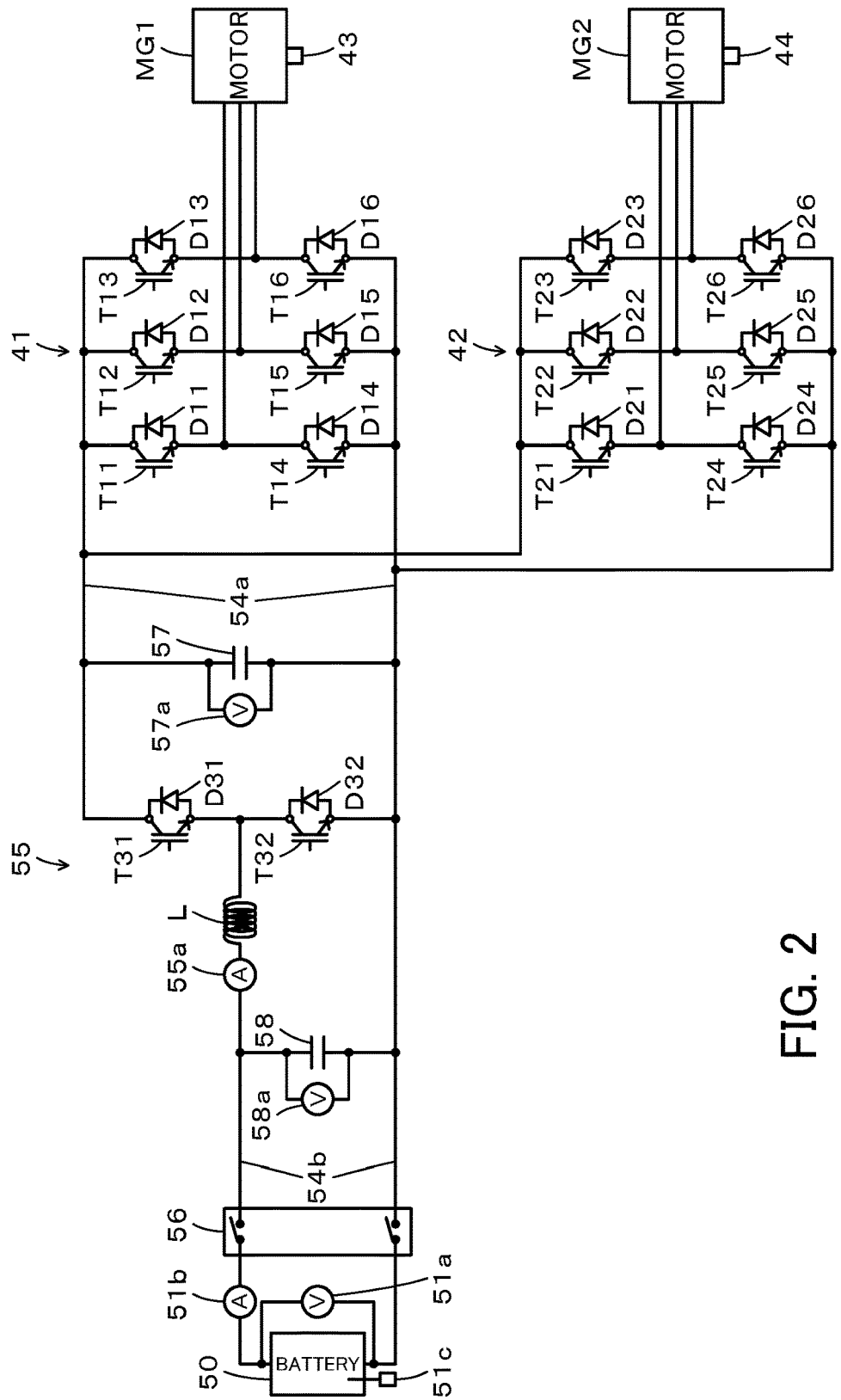
FIG. 2 is a configuration diagram showing an outline of a configuration of an electric machine drive system that includes motors MG1, MG2.

Next, a mode for carrying out the disclosure will be described with use of embodiments. FIG. 1 is a configuration diagram showing an outline of a configuration of a hybrid vehicle 20 that is an embodiment in the disclosure, and FIG. 2 is a configuration diagram showing an outline of a configuration of an electric machine drive system that includes motors MG1, MG2. As shown in FIG. 1, the hybrid vehicle 20 in the embodiment includes an engine 22, a planetary gear 30, motors MG1, MG2, inverters 41, 42, a battery 50 as an electric storage device, a boost converter 55, a main system relay 56, and a hybrid electronic control unit (hereinafter, referred to as a "HVECU") 70.

The engine 22 is configured as an internal-combustion engine that outputs power using gasoline, light oil or the like as fuel. The engine 22 is operated and controlled by an engine electronic control unit (hereinafter, referred to as an "engine ECU") 24.

The engine ECU 24 is configured as a microprocessor mainly constituted by a CPU, which is not illustrated, and includes a ROM that stores a processing program, a RAM that temporarily stores data, input/output ports, and a communication port, in addition to the CPU. To the engine ECU 24, signals from various sensors necessary to operate and control the engine 22, for example, a crank angle $\theta cr$ from a crank position sensor 23 that detects the rotational position of a crankshaft 26 of the engine 22, are input from input ports. From the engine ECU 24, various control signals for operating and controlling the engine 22 are output through output ports. The engine ECU 24 is connected with the HVECU 70 through the communication port. The engine ECU 24 computes a rotational speed Ne of the engine 22, based on the crank angle $\theta cr$ from the crank position sensor 23.

The planetary gear 30 is configured as a single-pinion planetary gear mechanism. A sun gear of the planetary gear 30 is connected with a rotor of the motor MG1. A ring gear of the planetary gear 30 is connected with a drive shaft 36 that is linked with drive wheels 39a, 39b through a differential gear 38. A carrier of the planetary gear 30 is connected with the crankshaft 26 of the engine 22 through a damper 28.

The motor MG1 is configured as a synchronous generator-motor including the rotor in which a permanent magnet is embedded and a stator which a three-phase coil is wound around, and as described above, the rotor is connected with the sun gear of the planetary gear 30. Similarly to the motor MG1, the motor MG2 is configured as a synchronous generator-motor including a rotor in which a permanent magnet is embedded and a stator which a three-phase coil is wound around, and the rotor is connected with the drive shaft 36.

As shown in FIG. 2, the inverter 41 is connected with a high-voltage-side electric power line 54a. The inverter 41 includes six transistors T11 to T16, and six diodes D11 to D16 that are connected in the reverse direction in parallel with the transistors T11 to T16. The transistors T11 to T16 are arranged in pairs such that a positive-side line and a negative-side line of the high-voltage-side electric power line 54a are a source side and a sink side, respectively. Further, the connection points of the transistor pairs of the transistors T11 to T16 are connected with the phases (U-phase, V-phase and W-phase) of the three-phase coil of the motor MG1, respectively. Accordingly, when voltage is applied to the inverter 41, the ratio of the ON time of the pairs of the transistors T11 to T16 is adjusted by a motor electronic control unit (hereinafter, referred to as a "motor ECU") 40, and thereby, a rotating magnetic field is generated in the three-phase coil, such that the motor MG1 is driven so as to rotate. Similarly to the inverter 41, the inverter 42 is connected with the high-voltage-side electric power line 54a, and includes six transistors T21 to T26 and six diodes D21 to D26. When voltage is applied to the inverter 42, the ratio of the ON time of the pairs of the transistors T21 to T26 is adjusted by the motor ECU 40, and thereby, a rotating magnetic field is generated in the three-phase coil, such that the motor MG2 is driven so as to rotate.

The boost converter 55 is connected with the high-voltage-side electric power line 54a with which the inverters 41, 42 are connected and a low-voltage-side electric power line 54b with which the battery 50 is connected. The boost converter 55 includes two transistors T31, T32, two diodes D31, D32 that are connected in the reverse direction in parallel with the transistor T31, T32, and a reactor L. The transistor T31 is connected with the positive-side line of the high-voltage-side electric power line 54a. The transistor T32 is connected with the transistor T31 and the negative-side line of the high-voltage-side electric power line 54a and the low-voltage-side electric power line 54b. The reactor L is connected with the connection point of the transistors T31, T32 and the positive-side line of the low-voltage-side electric power line 54b. The motor ECU 40 adjusts the ratio of the ON time of the transistors T31, T32, and thereby, the boost converter 55 raises the voltage of the electric power of the low-voltage-side electric power line 54b to supply the electric power to the high-voltage-side electric power line 54a, or drops the voltage of the electric power of the high-voltage-side electric power line 54a to supply the electric power to the low-voltage-side electric power line 54b. A smoothing capacitor 57 is attached to the positive-side line and negative-side line of the high-voltage-side electric power line 54a, and a smoothing capacitor 58 is attached to the positive-side line and negative-side line of the low-voltage-side electric power line 54b.

The motor ECU 40 is configured as a microprocessor mainly constituted by a CPU, which is not illustrated, and includes a ROM that stores a processing program, a RAM that temporarily stores data, input/output ports, and a communication port, in addition to the CPU. As shown in FIG. 1, to the motor ECU 40, signals from various sensors necessary to drive and control the motors MG1, MG2 and the boost converter 55 are input through input ports. Examples of the signal to be input to the motor ECU 40 includes rotational positions $\theta m1$, $\theta m2$ from rotational position detection sensors (for example, resolvers) 43, 44 that detect the rotational positions of the rotors of the motor MG1, MG2, and phase currents Iu1, Iv1, Iu2, Iv2 from unilliustrated current sensors that detect electric currents flowing in the phases of the motors MG1, MG2. In addition, examples thereof include a voltage (a voltage of high-voltage-side electric power line 54a (high-voltage-side voltage)) VH of the capacitor 57 from a voltage sensor 57a that is attached between the terminals of the capacitor 57, a voltage (a voltage of the low-voltage-side electric power line 54b (low-voltage-side voltage)) VL of the capacitor 58 from a voltage sensor 58a that is attached between the terminals of the capacitor 58, and an electric current (reactor current) IL to flow through the reactor L from a current sensor 55a that is attached to a terminal of the reactor L. From the motor ECU 40, switching control signals for the transistors T11 to T16, T21 to T26 of the inverters 41, 42, switching control signals for the transistors T31, T32 of the boost converter 55, and the like, are output through output ports. The motor ECU 40 is connected with the HVECU 70 through the communication port. The motor ECU 40 computes electric angles $\theta e1$, $\theta e2$ and rotational speeds Nm1, Nm2 of the motors MG1, MG2, based on the rotational positions $\theta m1$, θm2 of the rotors of the motors MG1, MG2 from the rotational position detection sensors 43, 44.

The battery 50 is configured, for example, as a lithium-ion secondary battery or a nickel-hydrogen secondary battery, and is connected with the low-voltage-side electric power line 54b. The battery 50 is managed by a battery electronic control unit (hereinafter, referred to as a "battery ECU") 52.

The battery ECU 52 is configured as a microprocessor mainly constituted by a CPU, which is not illustrated, and includes a ROM that stores a processing program, a RAM that temporarily stores data, input/output ports, and a communication port, in addition to the CPU. To the battery ECU 52, signals from various sensors necessary to manage the battery 50 are input through input ports. Examples of the signal to be input to the battery ECU 52 include a voltage (battery voltage) VB from a voltage sensor 51a that is disposed between the terminals of the battery 50, an electric current (battery current) IB from a current sensor 51b that is attached to the output terminal of the battery 50, and a temperature (battery temperature) Tb from a temperature sensor 51c that is attached to the battery 50. The battery ECU 52 is connected with the HVECU 70 through the communication port. The battery ECU 52 computes a state-of-charge SOC based on the integrated value of the battery current IB from the current sensor 51b. The state-of-charge SOC is the ratio of the dischargeable power capacity of the battery 50 to the full capacity of the battery 50.

The system main relay 56 is provided on the low-voltage-side electric power line 54b so as to be closer to the battery 50 than the capacitor 58 is. By the ON/OFF control from the HVECU 70, the system main relay 56 performs the connection and disconnection between the battery 50 and the boost converter 55.

The HVECU 70 is configured as a microprocessor mainly constituted by a CPU, which is not illustrated, and includes a ROM that stores a processing program, a RAM that temporarily stores data, input/output ports, and a communication port, in addition to the CPU. To the HVECU 70, signals from various sensors are input through input ports. Examples of the signal to be input to the HVECU 70 includes an ignition signal from an ignition switch 80, a shift position SP from a shift position sensor 82 that detects the operation position of a shift lever 81. In addition, examples thereof include an accelerator opening degree Acc from an accelerator pedal position sensor 84 that detects the stepping amount of an accelerator pedal 83, a brake pedal position BP from a brake pedal position sensor 86 that detects the stepping amount of a brake pedal 85, and a vehicle speed V from a vehicle speed sensor 88. The shift position SP includes a parking position (P position), a reversing position (R position), a neutral position (N position), a driving position (D position) and the like. As described above, the HVECU 70 is connected with the engine ECU 24, the motor ECU 40 and the battery ECU 52 through the communication port.

The configured hybrid vehicle 20 in the embodiment travels in a hybrid travelling (HV travelling) mode of travelling with the operation of the engine 22 or an electric travelling (EV travelling) mode of travelling without the operation of the engine 22.

In the HV travelling mode, the HVECU 70 sets a required torque Td* that is required for travelling (that is required for the drive shaft 36), based on the accelerator opening degree Acc and the vehicle speed V, and calculates a required power Pd* that is required for travelling (that is required for the drive shaft 36), by multiplying the set required torque Td* by the rotational speed Nd of the drive shaft 36 (the rotational speed Nm2 of the motor MG2). Subsequently, a required power Pe* that is required for the vehicle (that is required for the engine 22) is set, by subtracting, from the required power Pd*, a charge/discharge required power Pb* (the value is positive when the battery 50 is discharged) based on the state-of-charge SOC of the battery 50. Next, a target rotational speed Ne* and a target torque Te* of the engine 22 and torque commands Tm1*, Tm2* of the motors MG1, MG2 are set such that the required power Pe* is output from the engine 22 and the required torque Td* is output to the drive shaft 36. Subsequently, a target voltage VH* of the high-voltage-side electric power line 54a (capacitor 57) is set based on the torque commands Tm1*, Tm2* and rotational speeds Nm1, Nm2 of the motors MG1, MG2. Then, the target rotational speed Ne* and target torque Te* of the engine 22 are sent to the engine ECU 24, and the torque commands Tm1*, Tm2* of the motors MG1, MG2 and the target voltage VH* of the high-voltage-side electric power line 54a are sent to the motor ECU 40. The engine ECU 24 performs an intake air amount control, a fuel injection control, an ignition control and the like of the engine 22 such that the engine 22 is operated based on the target rotational speed Ne* and the target torque Te*. The motor ECU 40 performs the switching control of the transistors T11 to T16, T21 to T26 of the inverters 41, 42 such that the motors MG1, MG2 are driven at the torque commands Tm1*, Tm2*, and performs the switching control of the transistors T31, T32 of the boost converter 55 such that the voltage (high-voltage-side voltage) VH of the high-voltage-side electric power line 54a becomes the target voltage VH*.

In the EV travelling mode, the HVECU 70 sets the required torque Td* based on the accelerator opening degree Acc and the vehicle speed V, sets the torque command Tm1* of the motor MG1 to the value of 0, sets the torque command Tm2* of the motor MG2 such that the required torque Td* is output to the drive shaft 36, and sets the target voltage VH* of the high-voltage-side electric power line 54a based on the torque commands Tm1*, Tm2* and rotational speeds Nm1, Nm2 of the motor MG1, MG2. Then, the torque commands Tm1*, Tm2* of the motors MG1, MG2 and the target voltage VH* of the high-voltage-side electric power line 54a are sent to the motor ECU 40. The control of the inverters 41, 42 and boost converter 55 by the motor ECU 40 has been described above.

Figure 3:
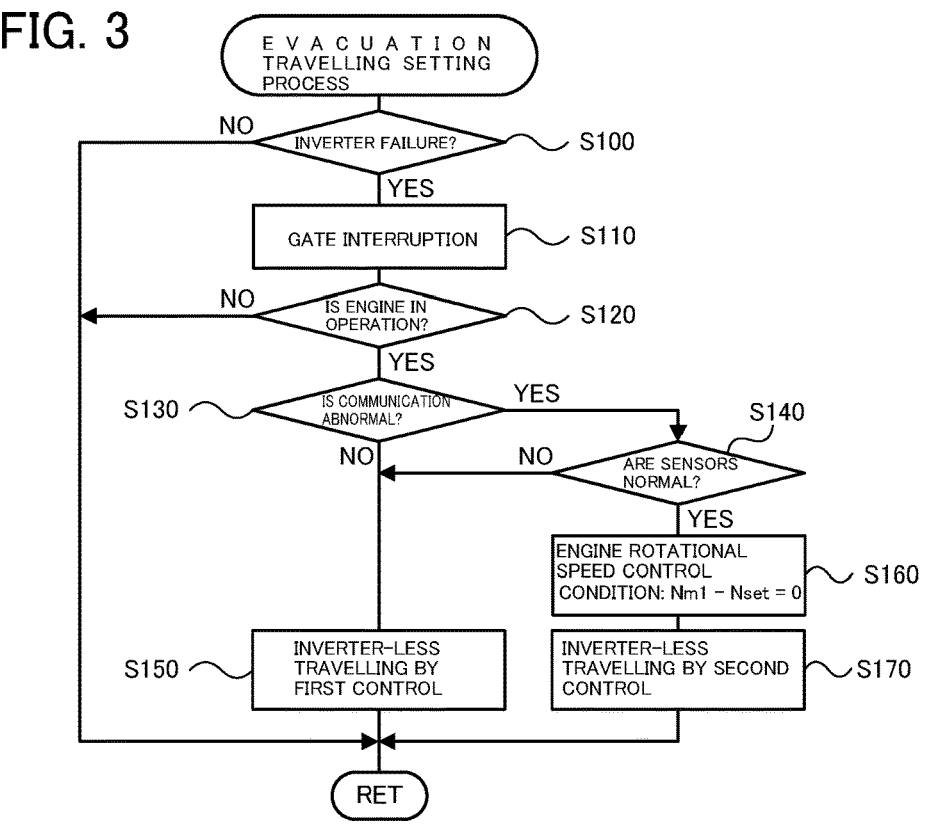
FIG. 3 is a flowchart showing an exemplary evacuation travelling setting process that is executed by a HVECU 70.

Next, an operation of the configured hybrid vehicle 20 in the embodiment, particularly, an operation in an evacuation travelling at the time of the occurrence of a failure (inverter failure) in which the inverters 41, 42 cannot be normally actuated will be described. The inverter failure includes a case where the inverters 41, 42 cannot be normally actuated because of the occurrence of the failure of the inverters 41, 42, a case where the actuation of the inverters 41, 42 by the motor ECU 40 cannot be performed based on the command from the HVECU 70 because of the occurrence of the abnormity of the communication between the motor ECU 40 and the HVECU 70, and the like. FIG. 3 is a flowchart showing an exemplary evacuation travelling setting process that is executed by the HVECU 70 when the inverter failure occurs. This process is executed repeatedly every predetermined time (for example, every several tens of milliseconds).

When the evacuation travelling setting process is executed, the HVECU 70, first, determines whether the inverter failure has occurred (step S100). When it is determined that the inverter failure has not occurred, it is judged that the process is unnecessary, and the process is ended.

Figure 4:
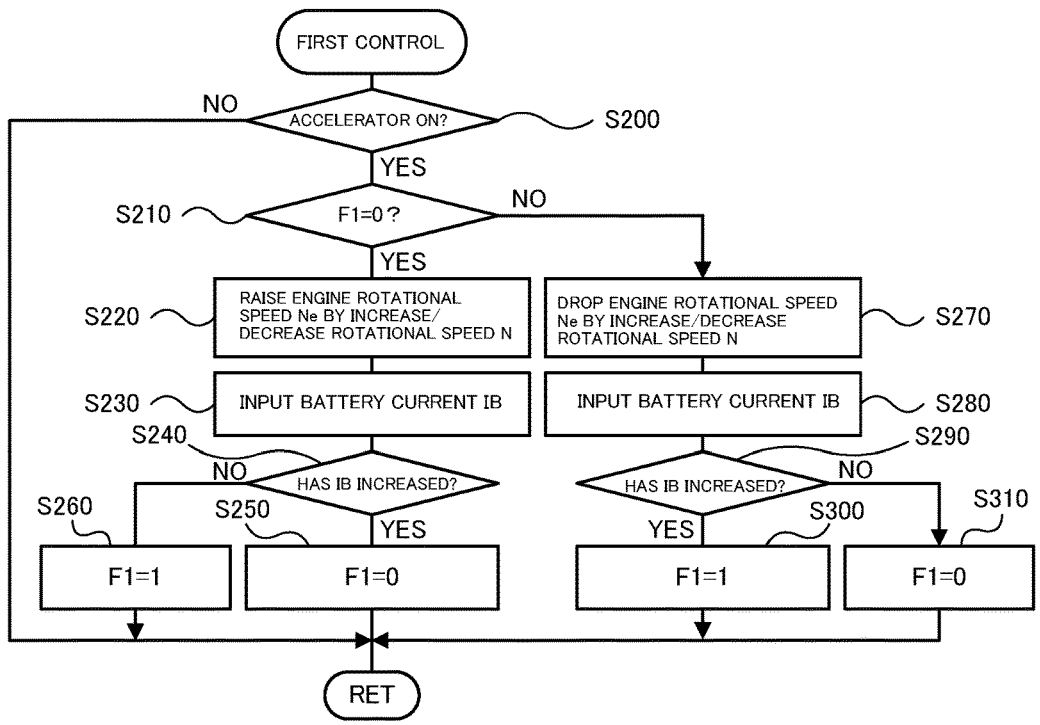
FIG. 4 is a flowchart showing an exemplary process at the time of an inverter-less travelling by a first control that is executed by the HVECU 70.
Figure 5:
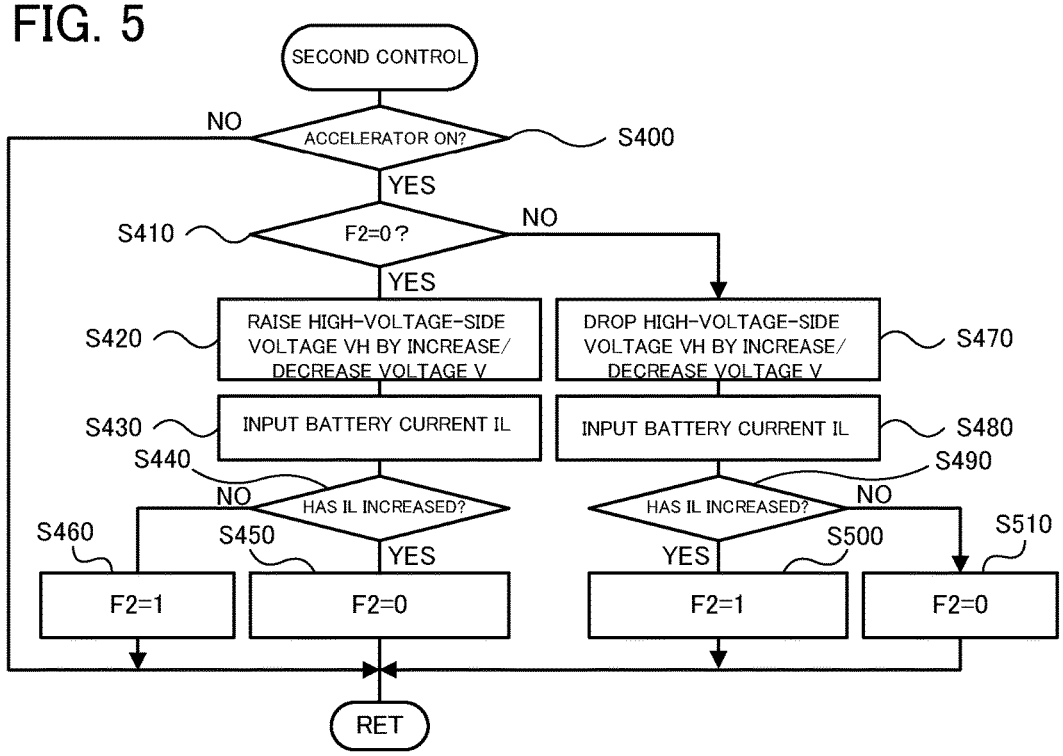
FIG. 5 is a flowchart showing an exemplary process at the time of an inverter-less travelling by a second control that is executed by a motor ECU 40.

When it is determined that the inverter failure has occurred, the gate interruption of the inverters 41, 42 is performed (step S110), and it is determined whether the engine 22 is in operation (step S120). When it is determined that the engine 22 is under suspension, it is judged that the process is unnecessary, and the process is ended. When it is determined that the engine 22 is in operation, it is determined whether the inverter failure is due to the abnormality of the communication between the motor ECU 40 and the HVECU 70 (step S130). When it is determined that the inverter failure is not due to the abnormality of the communication between the motor ECU 40 and the HVECU 70, an inverter-less travelling by a first control exemplified in FIG. 4 is performed as the evacuation travelling (step S150), and the process is ended. On the other hand, when it is determined that the inverter failure is due to the abnormality of the communication between the motor ECU 40 and the HVECU 70, it is determined whether the current sensor 55a and the voltage sensor 57a are normal (step S140). When it is determined that the current sensor 55a and the voltage sensor 57a are normal, a control signal for controlling the rotational speed Ne of the engine 22 such that the rotational speed Nm1 of the motor MG1 becomes a predetermined rotational speed Nset is sent to the engine ECU 24 (step S160), an inverter-less travelling by a second control exemplified in FIG. 5 is performed (step S170), and the process is ended. When it is determined that the current sensor 55a or the voltage sensor 57a is not normal, the inverter-less travelling by the first control exemplified in FIG. 4 is performed (step S150), and the process is ended.

The inverter-less travelling by the first control is performed by the execution of the first control in FIG. 4 by the HVECU 70. In the first control, the HVECU 70, first, determines whether the accelerator has been turned on by stepping on the accelerator pedal 83 (step S200). When it is determined that the accelerator has not been turned on, it is judged that the drive torque is unnecessary, and the process is ended.

When it is determined that the accelerator has been turned on, it is determined whether a process determination flag F1 has the value of 0 (step S210). The process determination flag F1 is set in the first control, and the initial value is set to the value of 0. When it is determined that the process determination flag F1 has the value of 0, the rotational speed Ne of the engine 22 is raised by an increase/decrease rotational speed ΔN (step S220), the battery current IB from the current sensor 51b is input (step S230), and it is determined whether the battery current IB has increased (step S240). When it is determined that the battery current IB has increased, the process determination flag F1 is set to the value of 0 (step S250), and the process is ended. On the other hand, it is determined that the battery current IB has not increased, that is, has decreased, the process determination flag F1 is set to the value of 1 (step S260), and the process is ended. Accordingly, while it is determined that the accelerator continues to be in the ON state and the battery current IB has increased, steps S200 to S250 are executed repeatedly, and the rotational speed Ne of the engine 22 is raised by increase/decrease rotational speed ΔN increments.

When it is determined that the process determination flag F1 does not have the value of 0, that is, has the value of 1 in step S210, the rotational speed Ne of the engine 22 is dropped by the increase/decrease rotational speed ΔN (step S270), the battery current IB from the current sensor 51b is input (step S280), and it is determined whether the battery current IB has increased (step S290). When it is determined that the battery current IB has increased, the process determination flag F1 is set to the value of 1 (step S300), and the process is ended. On the other hand, when it is determined that the battery current IB has not increased, that is, has decreased, the process determination F1 is set to the value of 0 (step S310), and the process is ended. Accordingly, while it is determined that the accelerator continues to be in the ON state and the battery current IB has increased, steps S200, S210, S270 to S300 are executed repeatedly, and the rotational speed Ne of the engine 22 is dropped by increase/decrease rotational speed ΔN increments.

Figure 6:
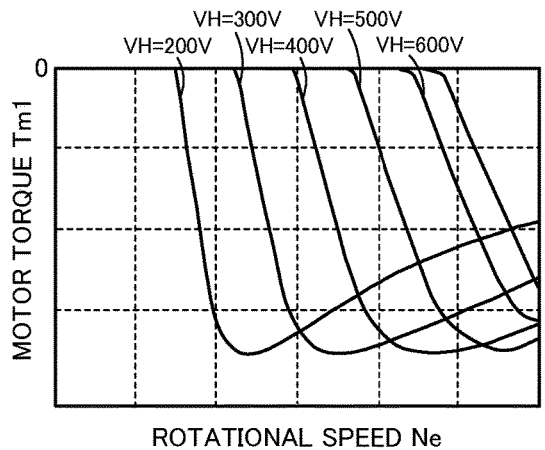
FIG. 6 is an explanatory diagram showing an exemplary relation between the full-wave rectification torque of the motor MG1 and the rotational speed and high-voltage-side voltage VH of the motor MG1.

By this first control, the rotational speed Ne of the engine 22 converges at a rotational speed that maximizes the battery current IB. The battery current IB is the electric current that flows from the high-voltage-side electric power line 54a to the battery 50 through the boost converter 55 and the low-voltage-side electric power line 54b by the reverses voltage of the motor MG1 while the motor MG1 is co-rotated with the operation of the engine 22. Therefore, the full-wave rectification torque (regenerative torque) of the motor MG1 increases as the battery current IB increases. Accordingly, by the first control, the rotational speed Ne of the engine 22 is controlled such that the battery current IB is maximized, in other words, the rotational speed Ne of the engine 22 is controlled such that the full-wave rectification torque (regenerative torque) of the motor MG1 is maximized. The full-wave rectification torque (regenerative torque) of the motor MG1 is determined by the electric potential difference between the reverse voltage of the motor MG1 and the high-voltage-side voltage VH. As shown in FIG. 6, the rotational speed of the motor MG1 that maximizes the full-wave rectification torque (regenerative torque) of the motor MG1 varies depending on the high-voltage-side voltage VH. Further, even in the case of the same high-voltage-side voltage VH, the rotational speed of the motor MG1 that maximizes the full-wave rectification torque (regenerative torque) of the motor MG1 varies depending on the manufacturing variation of the motor MG1, the temperature of the motor MG1, the sensor error of the voltage sensor, and the like. In the embodiment, in consideration of the circumstances, the first control is performed for maximizing the full-wave rectification torque (regenerative torque) of the motor MG1. Here, the reason why the full-wave rectification torque (regenerative torque) of the motor MG1 is maximized in the ON state of the accelerator is because the motor MG1 cannot output a high regenerative torque compared to the case where the inverter 41 can be normally actuated.

Figure 7:
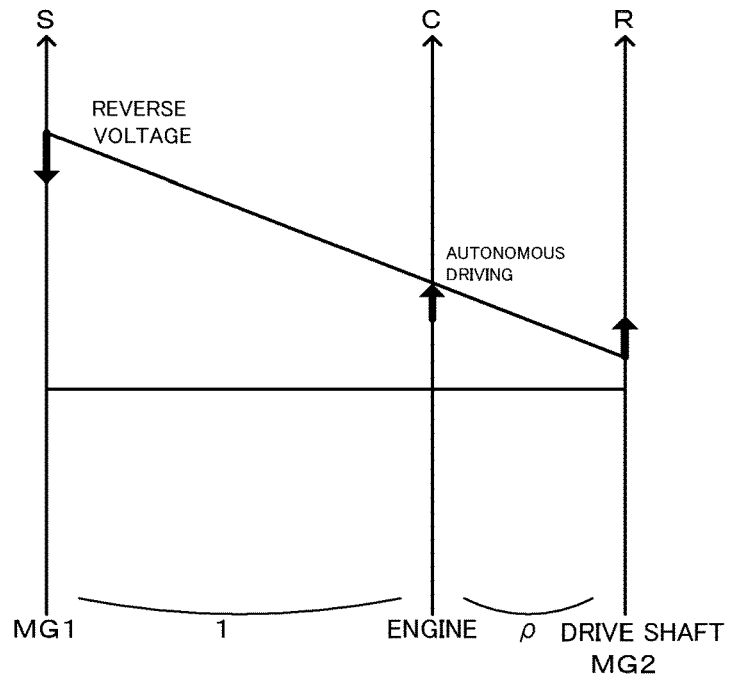
FIG. 7 is an explanatory diagram using a nomogram showing a dynamic relation between rotational speed and torque in rotational elements of a planetary gear 30.

FIG. 7 is an explanatory diagram using a nomogram showing a dynamic relation between rotational speed and torque in the rotational elements of the planetary gear 30 at the time of travelling by the full-wave rectification torque (regenerative torque) generated due to the generation of the reverse voltage of the motor MG1. In the figure, the left S-axis indicates the rotational speed of the sun gear that is the rotational speed Nm1 of the motor MG1, the C-axis indicates the rotational speed of the carrier that is the rotational speed Ne of the engine 22, and the R-axis indicates the rotational speed Nr of the ring gear that is the rotational speed Nm2 of the motor MG2. The thick arrow on the R-axis indicates the torque that is output from the motor MG1 and is applied to the drive shaft 36 through the planetary gear 30. As shown in the figure, the full-wave rectification torque generated due to the generation of the reverse voltage of the motor MG1 is applied to the drive shaft 36 through the planetary gear 30, and by this drive torque, the vehicle travels.

The inverter-less travelling by the second control is performed by the execution of the second control in FIG. 5 by the motor ECU 40. As described in the evacuation travelling setting process of FIG. 3, in the second control, the rotational speed Ne of the engine 22 is controlled such that the rotational speed Nm1 of the motor MG1 becomes the predetermined rotational speed Nset. Here, the predetermined rotational speed Nset is the rotational speed (for example, 6500 rpm) of the motor MG1 that maximizes the full-wave rectification torque (regenerative torque) of the motor MG1 when the high-voltage-side voltage VH is a previously determined voltage V1 (for example, 350 V).

When the second control is executed, the motor ECU 40, first, determines whether the accelerator has been turned on by stepping on the accelerator pedal 83 (step S400). When it is determined that the accelerator has not been turned on, it is judged that the drive torque is unnecessary, and the process is ended.

When it is determined that the accelerator has been turned on, it is determined whether a process determination flag F2 has the value of 0 (step S410). The process determination flag F2 is set in the second control, and the initial value is set to the value of 0. When it is determined that the process determination flag F2 has the value of 0, the high-voltage-side voltage VH is raised by an increase/decrease voltage ΔV (step S420), the reactor current IL from the current sensor 55a is input (step S430), and it is determined whether the reactor current IL has increased (step S440). When it is determined that the reactor current IL has increased, the process determination flag F2 is set to the value of 0 (step S450), and the process is ended. On the other hand, when it is determined the reactor current IL has not increased, that is, has decreased, the process determination flag F2 is set to the value of 1 (step S460), and the process is ended. Accordingly, while it is determined that the accelerator continues to be in the ON state and the reactor current IL has increased, steps S400 to S450 are executed repeatedly, and the high-voltage-side voltage VH is raised by increase/decrease voltage ΔV increments. Here, the control of the high-voltage-side voltage VH can be performed by the boost converter 55.

When it is determined that the process determination flag F2 does not have the value of 0, that is, has the value of 1 in step S410, the high-voltage-side voltage VH is dropped by the increase/decrease voltage ΔV (step S470), the reactor current IL from the current sensor 55a is input (step S480), and it is determined whether the reactor current IL has increased (step S490). When it is determined that the reactor current IL has increased, the process determination flag F2 is set to the value of 1 (step S500), and the process is ended. On the other hand, when it is determined that the reactor current IL has not increased, that is, has decreased, the process determination flag F2 is set to the value of 0 (step S510), and the process is ended. Accordingly, while it is determined that the accelerator continues to be in the ON state and the reactor current IL has increased, steps S400, S410, S470 to S500 are executed repeatedly, and the high-voltage-side voltage VH is dropped by increase/decrease voltage ΔV increments.

By this second control, the high-voltage-side voltage VH converges at a voltage that maximizes the reactor current IL. The reactor current IL is the electric current that flows from the high-voltage-side electric power line 54a to the low-voltage-side electric power line 54b through the boost converter 55 by the reverse voltage of the motor MG1. Therefore, the full-wave rectification torque (regenerative torque) of the motor MG1 increases as the reactor current IL increases. Accordingly, by the second control, in the state where the rotational speed Nm1 of the motor MG1 is the predetermined rotational speed Nset, the high-voltage-side voltage VH is controlled such that the reactor current IL is maximized, in other words, the high-voltage-side voltage VH is controlled such that the full-wave rectification torque (regenerative torque) of the motor MG1 is maximized. As described above, the full-wave rectification torque (regenerative torque) of the motor MG1 is determined by the electric potential difference between the reverse voltage of the motor MG1 and the high-voltage-side voltage VH. As shown in FIG. 6, the rotational speed of the motor MG1 that maximizes the full-wave rectification torque (regenerative torque) of the motor MG1 varies depending on the high-voltage-side voltage VH. Further, even in the case of the same high-voltage-side voltage VH, the rotational speed of the motor MG1 that maximizes the full-wave rectification torque (regenerative torque) of the motor MG1 varies depending on the manufacturing variation of the motor MG1, the temperature of the motor MG1, the sensor error of the voltage sensor, and the like. In the embodiment, in consideration of the circumstances, the second control is performed for maximizing the full-wave rectification torque (regenerative torque) of the motor MG1.

The reason why the second control is executed instead of the first control is because the full-wave rectification torque (regenerative torque) of the motor MG1 is maximized at a higher accuracy than the first control. To the low-voltage-side electric power line 54b, in some cases, although not illustrated in FIG. 1, a DC/DC converter for supplying electric power to an auxiliary machine battery that is an electric power source for an auxiliary machine and the like is attached, or a DC/AC converter for supplying electric power to a compressor of an air conditioner in an occupant room is attached. In this case, there is a gap between the electric current by the full-wave rectification torque (regenerative torque) of the motor MG1 and the battery current IB. On the other hand, there is no gap between the electric current by the full-wave rectification torque (regenerative torque) of the motor MG1 and the reactor current IL. Therefore, by the second control, it is possible to maximize the full-wave rectification torque (regenerative torque) of the motor MG1 at a higher accuracy. Accordingly, it is desired that the second control is executed when the inverter-less travelling by the second control can be executed.

When the inverter failure is due to the abnormity of the communication between the HVECU 70 and the motor ECU 40, the control command of the boost converter 55 cannot be sent from the HVECU 70 to the motor ECU 40 because of the abnormity of the communication, and therefore, the second control cannot be executed. Further, even when the inverter failure is not due to the abnormity of the communication between the HVECU 70 and the motor ECU 40, the second control cannot be executed if the current sensor 55a or the voltage sensor 57a is not normal. In the embodiment, in such cases, the first control, which is lower in accuracy than the second control, is executed for avoiding the evacuation travelling from being impossible.

In the hybrid vehicle 20 in the embodiment described above, when the inverter failure is due to the abnormity of the communication between the HVECU 70 and the motor ECU 40, or when the inverter failure is not due to the abnormity of the communication between the HVECU 70 and the motor ECU 40 but the current sensor 55a or the voltage sensor 57a is not normal, the gate interruption of the inverters 41, 42 is performed, and the rotational speed Ne of the engine 22 is controlled such that the battery current IB is maximized. Thereby, it is possible to maximize the full-wave rectification torque (regenerative torque) of the motor MG1. As a result, at the time of the evacuation travelling, it is possible to output a higher torque from the motor MG1.

Further, in the hybrid vehicle 20 in the embodiment, when the inverter failure is not due to the abnormality of the communication between the HVECU 70 and the motor ECU 40 and the current sensor 55a and the voltage sensor 57a are normally actuated, the gate interruption of the inverters 41, 42 is performed, the high-voltage-side voltage VH is controlled such that the reactor current IL is maximized, in the state where the rotational speed Nm1 of the motor MG1 is the predetermined rotational speed Nset. Thereby, it is possible to maximize the full-wave rectification torque (regenerative torque) of the motor MG1. As a result, at the time of the evacuation travelling, it is possible to output a higher torque from the motor MG1.

In the hybrid vehicle 20 in the embodiment, the inverter-less travelling by the second control is performed, when the inverter failure is not due to the abnormality of the communication between the HVECU 70 and the motor ECU 40 and the current sensor 55a and the voltage sensor 57a are normally actuated. However, at the time of the inverter failure, the inverter-less travelling by the first control may be always performed as the evacuation travelling, regardless of the cause of the failure.

Figure 8:
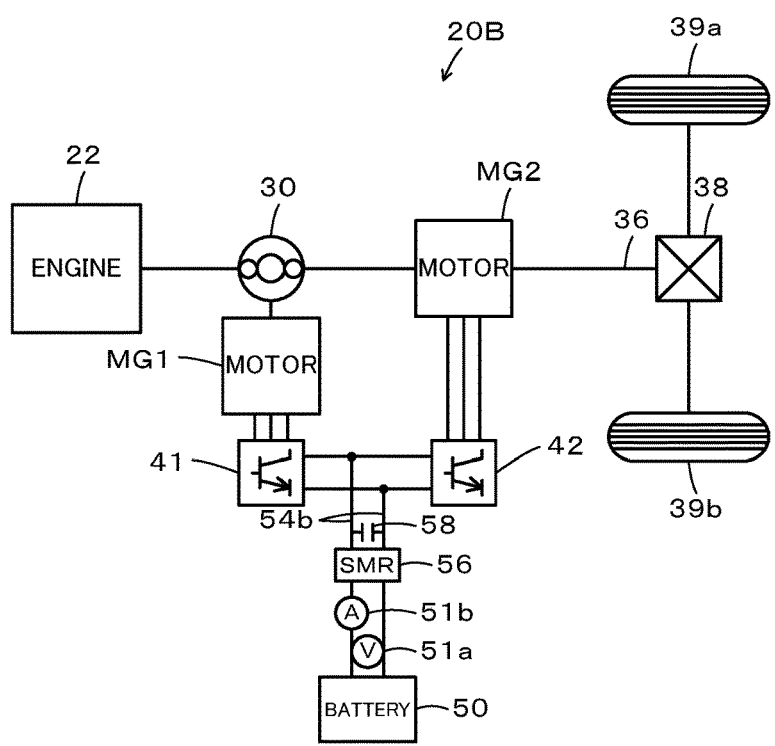
FIG. 8 is a configuration diagram showing an outline of a configuration of a hybrid vehicle 20B in a modification.

In the embodiment, the disclosure is applied to the hybrid vehicle 20 including the boost converter 55 between the battery 50 and the inverters 41, 42, but the boost converter 55 may be excluded as shown in a hybrid vehicle 20B in a modification in FIG. 8. In this case, at the time of the inverter failure, the inverter-less travelling by the first control may be always performed as the evacuation travelling.

In the hybrid vehicle in the disclosure, the control device, as the first control, controls the rotational speed of the engine such that the first electric current is maximized, based on an increase or decrease in the first electric current when increasing or decreasing the rotational speed of the engine. For example, the following processes (1) to (4) are performed. Thereby, it is possible to maximize the torque of the first motor, even in the case where there is, for example, the manufacturing variation of the motor, the change in the temperature of the motor, or the sensor error of the voltage sensor or the like.

(1) If the first electric current increases when the rotational speed of the engine is increased, the rotational speed of the engine is further increased.

(2) If the first electric current decreases when the rotational speed of the engine is increased, the rotational speed of the engine is decreased.

(3) If the first electric current increases when the rotational speed of the engine is decreased, the rotational speed of the engine is further decreased.

(4) If the first electric current decreases when the rotational speed of the engine is decreased, the rotational speed of the engine is increased.

In the hybrid vehicle in the disclosure may include a converter that is connected with a first electric power line and a second electric power line and that exchanges electric power between the first electric power line and the second electric power line by regulating a high-voltage-side voltage of the second electric power line, the first electric power line being connected with the electric storage device, the second electric power line being connected with the first inverter and the second inverter; and the control device that controls the converter and executes a second control instead of the first control, when a second electric current to flow from the second electric power line to the first electric power line can be detected and the high-voltage-side voltage can be detected at the time of the evacuation travelling, the second control controlling the rotational speed of the engine such that the first motor rotates at a predetermined rotational speed and controlling the high-voltage-side voltage such that the second electric current is maximized, in a state of shut-down of the first inverter and the second inverter. In the hybrid vehicle including the converter in this way, when the reverse voltage of the first motor becomes higher than the voltage of the direct current side of the first inverter and the second inverter, the electric current (second electric current) flows from the second electric power line to the first electric power line through the converter. The torque to be output from the first motor increases as the second electric current increases. The torque to be output from the first motor is determined by the electric potential difference between the reverse voltage and the voltage (high-voltage-side voltage) of the second electric power line. Accordingly, it is possible to maximize the torque to be output from the first motor, by adopting, as the predetermined rotational speed, a rotational speed that is likely to maximize the torque from the first motor, controlling the rotational speed of the engine such that the first motor rotates at the predetermined rotational speed, and controlling the high-voltage-side voltage such that the second electric current is maximized. In many cases, the first electric power line is connected with not only the electric storage device but also a DC/DC converter and the like for supplying electric power to an auxiliary machine. Therefore, the second control allows a higher torque to be accurately output from the first motor, compared to the first control in which the rotational speed of the engine is controlled such that the electric current to flow through the electric storage device is maximized. Here, the high-voltage-side voltage can be controlled by the converter.

In this case, the control device may control the high-voltage-side voltage such that the second electric current is maximized, based on an increase or decrease in the second electric current when increasing or decreasing the high-voltage-side voltage as the second control. That is, the following processes (5) to (8) are performed. Thereby, it is possible to maximize the torque of the first motor, even in the case where there is, for example, the manufacturing variation of the motor, the change in the temperature of the motor, or the sensor error of the voltage sensor or the like.

(5) If the second electric current increases when the high-voltage-side voltage is increased, the high-voltage-side voltage is further increased.

(6) if the second electric current decreases when the high-voltage-side voltage is increased, the high-voltage-side voltage is decreased.

(7) If the second electric current increases when the high-voltage-side voltage is decreased, the high-voltage-side voltage is further decreased.

(8) If the second electric current decreases when the high-voltage-side voltage is decreased, the high-voltage-side voltage is increased.

In the hybrid vehicle according to the aspect including the converter in the disclosure, the control device includes a first control unit that sets a drive command for travelling in response to an operation by a driver and that performs a drive control of the engine based on the drive command, the first control unit being a controlling member for the first control; and a second control unit that controls the first inverter, the second inverter and the converter based on the drive command by communication with the first control unit, the second control unit being a controlling member for the second control and the first control unit prohibits the second control by the second control unit and executes the first control, when the inverter failure is due to abnormality of the communication with the second control unit.

The correspondence relation between major elements of the embodiment and major elements of the invention described in SUMMARY will be described. In the embodiment, the engine 22 corresponds to the "engine", the motor MG1 corresponds to the "first motor", the planetary gear 30 corresponds to the "planetary gear mechanism", the motor MG2 corresponds to the "second motor", the inverter 41 corresponds to the "first inverter", the inverter 42 corresponds to the "second inverter", the battery 50 corresponds to the "electric storage device", and the HVECU 70, the engine ECU 24, the motor ECU 40 and the battery ECU 52 correspond to the "control device". Further, the low-voltage-side electric power line. 54b corresponds to the "first electric power line", the high-voltage-side electric power line 54a corresponds to the "second electric power line", and the boost converter 55 corresponds to the "converter". Furthermore, the HVECU 70, the engine ECU 24 and the battery ECU 52 correspond to the "first control unit", and the motor ECU 40 corresponds to the "second control unit". The battery current IB corresponds to the "first electric current", and the reactor current IL corresponds to the "second electric current".

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The present disclosure is applicable to the manufacturing industries of vehicle.

The invention claimed is:

1. A hybrid vehicle comprising:
an engine;
a first motor configured to generate reverse voltage by rotation;
a planetary gear mechanism configured to have three rotational elements connected with a drive shaft coupled with an axles, the engine and the first motor;
a second motor configured to input and output power from and to the driveshaft;
a first inverter configured to drive the first motor;
a second inverter configured to drive the second motor;
an electric storage device configured to be capable of exchanging electric power with the first motor and the second motor through the first inverter and the second inverter; and
a control device configured to control the engine, the first inverter and the second inverter, wherein
the control device executes a first control at the time of an evacuation travelling, the first control controlling a rotational speed of the engine such that a first electric current to flow through the electric storage device is maximized in a state of gate interruption of the first inverter and the second inverter, the evacuation travelling being performed when an ON operation of an accelerator is performed during an inverter failure in which the first inverter and the second inverter cannot be normally actuated.

2. The hybrid vehicle according to claim 1, wherein
the control device, as the first control, controls the rotational speed of the engine such that the first electric current is maximized, based on an increase or decrease in the first electric current when increasing or decreasing the rotational speed of the engine.

3. The hybrid vehicle according to claim 2, wherein
the control device, as the first control, controls the rotational speed of the engine such that the first electric current is maximized, by further increasing the rotational speed of the engine if the first electric current increases when increasing the rotational speed of the engine, decreasing the rotational speed of the engine if the first electric current decreases when increasing the rotational speed of the engine, further decreasing the rotational speed of the engine if the first electric current increases when decreasing the rotational speed of the engine, and increasing the rotational speed of the engine if the first electric current decreases when decreasing the rotational speed of the engine.

4. A hybrid vehicle comprising:
an engine;
a first motor configured to generate reverse voltage by rotation;
a planetary gear mechanism configured to have three rotational elements connected with a drive shaft coupled with an axles, the engine and the first motor;
a second motor configured to input and output power from and to the driveshaft;
a first inverter configured to drive the first motor;
a second inverter configured to drive the second motor;
an electric storage device configured to be capable of exchanging electric power with the first motor and the second motor through the first inverter and the second inverter;
a converter configured to be connected with a first electric power line and a second-electric power line and that exchanges electric power between the first electric power line and the second electric power line by regulating a high-voltage-side voltage of the second electric power line, the first electric power line being connected with the electric storage device, the second electric power line being connected with the first inverter and the second inverter; and
a control device configured to control the engine, the first inverter, the second inverter and the converter, wherein
the control device
executes a first control at the time of an evacuation travelling, the first control controlling a rotational speed of the engine such that a first electric current to flow through the electric storage device is maximized in a state of gate interruption of the first inverter and the second inverter, the evacuation travelling being performed when an ON operation of an accelerator is performed during an inverter failure in which the first inverter and the second inverter cannot be normally actuated, and
executes a second control instead of the first control, when a second electric current to flow from the second electric power line to the first electric power line can be detected and the high-voltage-side voltage can be detected at the time of the evacuation travelling, the second control controlling the rotational speed of the engine such that the first motor rotates at a predetermined rotational speed and controlling the high-voltage-side voltage such that the second electric current is maximized, in a state of shut-down of the first inverter and the second inverter.

5. The hybrid vehicle according to claim 4, wherein the control device,
as the first control, controls the rotational speed of the engine such that the first electric current is maximized, based on an increase or decrease in the first electric current when increasing or decreasing the rotational speed of the engine, and
as the second control, controls the high-voltage-side voltage such that the second electric current is maximized, based on an increase or decrease in the second electric current when increasing or decreasing the high-voltage-side voltage.

6. The hybrid vehicle according to claim 5, wherein the control device,
as the first control, controls the rotational speed of the engine such that the first electric current is maximized, by further increasing the rotational speed of the engine if the first electric current increases when increasing the rotational speed of the engine, decreasing the rotational speed of the engine if the first electric current decreases when increasing the rotational speed of the engine, further decreasing the rotational speed of the engine if the first electric current increases when decreasing the rotational speed of the engine, and increasing the rotational speed of the engine if the first electric current decreases when the decreasing the rotational speed of the engine, and
as the second control, controls the high-voltage-side voltage such that the second electric current is maximized, by further increasing the high-voltage-side voltage if the second electric current increases when increasing the high-voltage-side voltage, decreasing the high-voltage-side voltage if the second electric current decreases when increasing the high-voltage-side voltage, further decreasing the high-voltage-side voltage if the second electric current increases when decreasing the high-voltage-side voltage, and increasing the high-voltage-side voltage if the second electric current decreases when decreasing the high-voltage-side voltage.

7. The hybrid vehicle according to claim 4, wherein
the control device comprises: a first control unit that sets a drive command for travelling in response to an operation by a driver and that performs a drive control of the engine based on the drive command, the first control unit being a controlling member for the first control; and a second control unit that controls the first inverter, the second inverter and the converter based on the drive command by communication with the first control unit, the second control unit being a controlling member for the second control and
the first control unit prohibits the second control by the second control unit and executes the first control, when the inverter failure is due to abnormity of the communication with the second control unit.

* * * * *